United States Patent [19]
Tucker

[11] 3,841,809
[45] Oct. 15, 1974

[54] SEAL FOR RUBBER MOLDS
[75] Inventor: Alfred J. Tucker, Elgin, Ill.
[73] Assignee: Chicago Rawhide Manufacturing Company, Chicago, Ill.
[22] Filed: Sept. 8, 1972
[21] Appl. No.: 287,228

[52] U.S. Cl............. 425/110, 277/110, 425/DIG. 47, 425/406
[51] Int. Cl.............................................. B29h 9/00
[58] Field of Search............ 425/DIG. 47, 110, 117, 425/406, 423, 352; 277/102, 110, 112, 114

[56] References Cited
UNITED STATES PATENTS

| | | | |
|---|---|---|---|
| 2,903,310 | 9/1959 | Hill | 277/102 |
| 3,315,316 | 4/1967 | Baney et al. | 425/DIG. 47 |
| 3,442,518 | 5/1969 | Henshaw | 277/110 |
| 3,474,496 | 10/1969 | Klee | 425/242 X |
| 3,613,223 | 10/1971 | Bush | 425/DIG. 47 |
| 3,647,337 | 3/1972 | Dega | 425/242 |

*Primary Examiner*—Richard B. Lazarus

[57] ABSTRACT

A mold unit having upper and lower parts with surfaces defining a molding cavity, wherein the upper assembly includes two parts which are movable relative to each other. In use, the first part is spring urged into contact with a flange on a stamping contained in the molding cavity, while further downward movement moves the second movable part into a position of engagement with the charge of rubber to be molded. The relatively movable upper parts are sealed from each other by an annular ring of a stiff lubricous material, preferably polytetrafluoroethylene. The sealing ring is spaced apart from the surface of the movable part which engages the rubber, and lies atop a narrow, annular, tapered cavity communicating with the molding cavity. A limited amount of rubber is permitted to flow into the tapered cavity, while the ring scrapes portions of this rubber from one of the walls partially defining the cavity, thereby providing an effective seal to prevent rubber from undesirably entering between movable mold parts. Means are provided for confining the sealing ring and for adjustably applying a control force thereto to insure the desired contact force, and to accommodate the effects of cold flow. The shape of the cavity is arranged so that the flash or scrap contained in the tapered cavity is readily removed therefrom when the part is removed from the mold.

5 Claims, 3 Drawing Figures

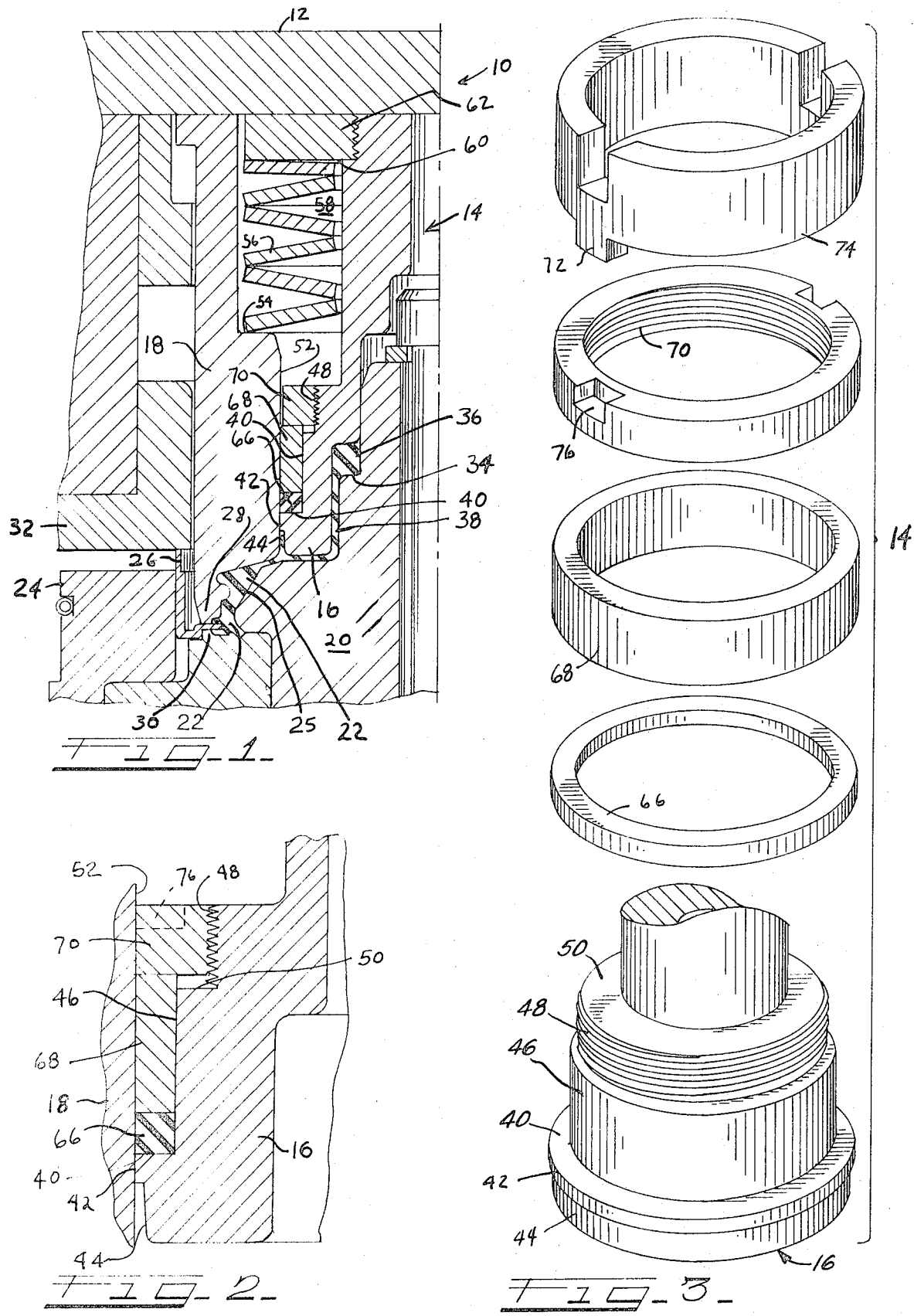

SEAL FOR RUBBER MOLDS

The present invention relates to apparatus and methods for molding, and more particularly, to an apparatus and method for forming molded products from rubber by so-called compression molding in order to produce a uniform part which is free from loosely adhering particles of rubber or so-called "flash".

It is well known in the prior art to form composite articles by compression molding methods, wherein the finished article has one preformed part, such as a metal stamping, and another part which is molded in place adjacent the first part and simultaneously bonded thereto as the composition becomes cured or cross-linked. Typical products made by this method include oil and grease seals wherein the preformed part is a metal stamping and wherein the lip portion is formed from a flexible, elastomeric material which is bonded thereto. In such seals, as is well known in the art, so-called flash or excess rubber is undesirable, since, in addition to creating an undesirable appearance in the finished part, it is likely to fall from the part and become entrained in the oil or grease lubricating the mechanism, with the possibility that the mechanism being sealed could be damaged.

Accordingly, the prior art has dealt with this problem by a number of methods, one of which includes bending the metal stamping during molding to form a flash barrier. This method is successful and attractive, but it involves the use of high forces and presents the hazard of rapid mold wear. Moreover, dimensional variations in the articles being formed sometimes cause lack of uniformity in the finished product.

One alternative to this method has been the use of double acting or multi-part molds wherein the stamping is held in place without being deformed by one mold part and wherein another mold part engages the rubber to be formed for compression molding thereof, that is, forcing the rubber "prep" into the molding cavity under a compressive load. This method is theoretically attractive and advantageous; however, it has not come into widespread use. A principal reason for this is that an effective seal has not been developed for disposition between relatively movable mold parts, with the consequence that, during forming, rubber escapes along relatively movable surfaces and clogs the mold, and damages the part, or both.

Another reason is that, even where seals have been provided which operate well initially, such seals have not performed consistently, and more particularly, the effective life of such seals has been quite short.

One of the principal reasons for this lack of performance has been that molding conditions are such that few materials are suitable, and because those materials which are initially suitable are difficult to form and often undergo cold flow. As a consequence of the above, when seals are selected so as to provide satisfactory initial performance, they often begin to fail relatively soon after installation, particularly when exposed to conditions of high molding pressure and high temperatures which are maintained for long periods of time.

Accordingly, there has been room for improvement in molding apparatus and methods of this general type, and in this sense, the present invention represents an improvement over such prior methods and apparatus, specifically, an improvement over the apparatus shown and described in application Ser. No. 180,057 (and now abandoned), filed Sept. 13, 1971 and assigned to applicant's assignee.

In view of the foregoing, an object of the invention is to provide an improved rubber molding apparatus and method.

Another object is to provide a molding apparatus which includes relatively movable parts and which further includes an effective seal to prevent escape of rubber between such parts.

A still further object is to provide a mold unit wherein one of the relatively movable mold parts includes a groove having disposed therein a seal unit which is made from a lubricous, high temperature resistant material such as polytetrafluorethylene.

Another object is to provide a double acting mold having a portion thereof adapted to receive a stamping having radially and axially extending flanges, and which has another portion adapted to be forced against one surface of the radial flange under the influence of spring pressure to establish a flash barrier prior to movement of another mold part to complete compression molding of the part, and wherein a seal between the two parts is established along a cylindrical surface by a "Teflon" or like ring.

A further object is to provide a mold wherein two relatively movable, coacting mold parts are urged at least partially axially apart from each other by springs associated therewith and wherein a taper of significant cross-section is provided between the lower portions of these mold parts for receiving rubber material and wherein the upper or reduced cross-section portion of the taper is sealed by a polytetrafluoroethylene ring having a tight but sliding fit between associated parts and providing minimum sliding friction therebetween.

Still another object is to provide a mold unit which includes a "Teflon" or like ring received around a portion of one mold part to provide a seal with an adjacent relatively movable part and wherein means are provided for axially loading the ring to force it radially outward into a snug sealing relation with the other or second part.

A still further object is to provide a novel construction of seal ring and ring adjusting mechanism.

Another object is to provide a mold part having a groove for receiving a unitary ring, a threaded portion, a seal ring compressor element, and means for positioning the compressor element so as to radially dimension the seal ring with desired accuracy.

Another object is to provide a mechanism as set forth above which facilitates easy insertion and removal of a seal ring and provides for easy adjustment thereof.

These and other objects of the invention are achieved by providing a mold having upper and lower assemblies with inwardly directed surfaces thereof at least partially defining a mold cavity, and with the upper assembly including at least a pair of relatively movable elements, one adapted to engage a stamping unit and the other adapted to force a piece of rubber stock into the mold cavity to produce a finished article, and a low friction, mechanically tight seal formed between opposed surfaces of the relatively movable mold parts, lying at the upper end of a tapered region lying between the parts and communicating with the molding cavity, and characterized by an annular, ring receiving surface, means for receiving a seal clamp or compressor having an oppositely directed surface, and means for positioning the compressor element so as to exert axial force on the seal ring.

The manner in which these objects and advantages are achieved in practice will be better understood when reference is made to the accompanying detailed description of a preferred embodiment of the invention set forth by way of example and shown in the accompanying drawings, wherein like reference numerals indicate corresponding parts throughout.

BRIEF DESCRIPTION OF THE DRAWINGS

FIG. 1 is a vertical sectional view of a portion of a mold assembly embodying the sliding seal assembly of the invention;

FIG. 2 is a sectional view, on an enlarged scale, of a portion of the mold of FIG. 1, showing the major components of the seal unit of the invention; and FIG. 3 is an exploded perspective view showing the relation of the mold parts to the seal ring, the ring compressor element, the adjustment means and a tool used for setting up the seal and for adjusting it thereafter.

DESCRIPTION OF THE PREFERRED EMBODIMENTS OF THE INVENTION

Whereas it will be understood that the principles of the invention may be embodied in different forms and put to various uses, the invention will be described with respect to an embodiment wherein an oil seal is the part to be manufactured, and wherein the mold consists of upper and lower assemblies with the upper assembly having at least two components which are movable relative to each other and which include a novel seal and seal adjusting mechanism associated therewith.

Referring now to the drawing in greater detail, FIG. 1, shows the invention to be embodied in a double acting, spring loaded compression mold unit generally designated 10 and including an upper, generally horizontally extending top cover plate 12, an upper mold part assembly generally designated 14 and shown to include a radially inner portion 16 and a radially outer portion 18 arranged co-axially so as to permit relative axial motion therebetween, and a lower insert 20. Oppositely directed portions of the upper mold part assembly 14 and the lower insert or mold part assembly 20 define therebetween a molding cavity 22. As shown, a metal part such as a stamping 26 is held in place between a downwardly directed land portion 28 of the outer mold portion 18 and an upwardly directed land 30 on the lower insert 20. The stamping 26 may be positioned by a centering ring 24, and a hold down plate 32 may also be provided for locating the stamping 26.

As is well known in the art, and as is brought forth in greater detail in application Ser. No. 180,057, filed Sept. 13, 1971, the upper mold part assembly 14 and the lower insert 20 move relative to each other so that portions thereof engage a ring or "prep" of rubber held on a shoulder 34 within a cavity 36, whereby vertical movement of the assembly 14, and particularly of the inner portion 16 thereof, compresses the prep and forces the rubber downwardly through passage 38 into the molding cavity 22 under a compressive force of a high order. Accordingly, this method of part formation is known as "compression" molding, and, when such process includes bonding of the part formed in the cavity 22 to another separately positioned or inserted part, such as the stamping 26, the process may also be referred to as insert molding.

Referring again to FIG. 1, it will be noted that the radially inner, upper mold portion 16 includes a radially extending surface 40, an axially extending, annular surface 42, a tapered surface 44, a reduced diameter surface 46 and a still further reduced diameter, threaded shank portion 48, disposed just above a radially extending shoulder 50.

The radially outer, upper mold portion 18 includes an axially extending cylindrical surface 52 which is closely spaced apart by a very slight working clearance from the oppositely directed surface 42 on the part 16. Moreover, a radially extending seat 54 is disposed above this surface for supporting the periphery of one of a plurality of Belleville washer type springs 56 disposed within an annular spring receiving cavity 58. The springs 56 are confined between the shoulder 54 on the outer mold part 18 and the radially extending surface 60 of a spring retainer 62 which is threadedly attached to the uppermost shank portion of the inner mold part 16.

As is also shown in FIG. 1, a seal ring 66 of a stiff but lubricous material such as polytetrafluoroethylene is seated on the surface 40, with a compression sleeve 68 disposed thereatop to confine the ring 66 between the surfaces 40, 46 of the mold part 16 and the lower surface of the sleeve 68. means in the form of a threaded ring 70 are provided for applying a downward, axial compressive force through the sleeve 68 to the ring 66 whereby the degree of confinement may be altered and whereby the sealing force between the axially extending outer edge of the ring 66 and the sealing surface 52 may be carefully controlled. This is preferably accomplished by engaging the lugs 72 of a spanner 74 (FIG. 3) with the grooves 76 in the threaded ring 70, and turning the ring 70 until the desired adjustment is reached.

In the use of the apparatus, the springs 56 between mold portions 16 and 18 serve to urge the mold portion 18 downwardly in respect to portion 16, and a closing force applied as by top plate 12 to the upper part of the inner mold portion 16 will be transmitted through the springs 56, so as to act on the outer portion 18 and move it downwardly. When the land 28 on the mold part 18 engages the upper surface of the flange on the stamping or seal insert 26, a further closing force applied to the upper portion of the inner, upper mold portion 16 will move the inner portion 16 downwardly, causing the rubber prep received in the cavity 36 to be forced through the passage 38 and into the molding cavity 22. Accordingly, one flash barrier is established between the stamping 26 and the lands 28, 30 to prevent flow of rubber outwardly of the mold at this point, while the combination of the closely spaced surfaces 42, 52 and the seal ring 66 creates a second flash barrier and prevents flow of molten rubber upwardly along the surface 52. Accordingly, relative motion between the parts 16, 18 does not create a problem of leakage which might otherwise occur if an effective seal were not provided in this area.

Assuming now that the mold assembly 10 has been in use for some time, and that the Teflon or other suitable material comprising the ring 66 has undergone cold flow or other relatively permanent deformation, the ring 66 may be effectively re-sized by inserting the lugs 72 on the spanner or wrench 74 with the grooves 76 in the threaded adjusting ring or sleeve 70 and rotating the ring 70 until the ring compression sleeve 68 is moved somewhat downwardly. This action will serve to cause the ring 66, which is confined on three surfaces, to expand slightly radially outwardly so as to engage the cylindrical sealing surface 52 with the desired increased force and thereby to prevent movement of molten rubber stock into the area between relatively movable mold parts 16, 18.

Referring now to FIG. 3, another advantage of the invention is shown, namely, that with the upper part assembly 14 disassembled, a new Teflon sealing ring 66 may be easily inserted. Accordingly, as shown, the spanner 74 may be manipulated so as to remove the adjusting ring, the compression sleeve 68 may be removed, and the worn ring 66 removed from the shoulder 40. Thereupon, a new unitary seal ring of Teflon or other suitable material may be inserted and assembly accomplished by reversing disassembly steps just described. An arrangement of this type enables a one-piece seal ring 66 to be used, eliminating the problem of end gap leakage and greatly simplifying the problem of ring removal and replacement.

Although the unit 10 is shown in the closed position, that is, with the mold cavity 22 in the form of the rubber body portion 25, the seal unit which is to be manufactured, and with the upper and lower lands 28, 30 contacting the stamping 26, it will be understood that, in the initial position, the "prep" is of annular cross-section and is inserted in the area 36 atop the shoulder 34 when the mold is open, and that customarily, the mold is heated to or near the vulcanizing temperature when the prep is placed therein. Subsequently, simple downward movement of the top plate 12 which is brought about within a known type of molding press, serves in a single operation to perform the multiple functions of establishing the flash barriers, filling the mold, and holding the mold parts in the closed position for a sufficient time to cause the rubber to become sufficiently cured for part removal from the mold.

In other respects, the mold unit 10 is conventional, that is, it may be used to mold various types of rubber parts, the cross-sectional form of the part may be varied considerably, the stamping may be merely a flat washer or may have one of a number of different shapes, and for example, and the seal lip may be formed with or without the auxiliary dirt lip shown in FIG. 1. From the cross-sectional features of the mold cavity, those skilled in the seal art will recognize that a so-called trimmed lip form of seal is being made, that is, the sealing lip on the finished seal will result from a cut performed in a seal trimming operation. However, the principles of the invention are also applicable to manufacture of seals by the so-called molded lip method, that is, the method whereby the primary sealing lip is fully shaped within the mold by molding alone rather than by a subsequent trimming or cutting operation.

Depending on the desires of the operator and the characteristics of the materials being used, vacuum may be applied to the molding cavity or surrounding parts, or both, either continuously or intermittently.

It will thus be seen, that the present invention provides an improved molding apparatus and method having a number of advantages and characteristics including those pointed out herein and others which are inherent in the invention. Preferred embodiments having been described merely by way of example, it is anticipated that various modifications will occur to those skilled in the art and it is anticipated that such changes may be made without departing from the spirit of the invention or the scope of the appended claims.

I claim:

1. A mold unit for flashless molding of composite parts, said mold unit including first and second mold assemblies, at least one portion of said first assembly and one portion of said second assembly having generally oppositely directed surface portions defining the interior of a molding cavity in the closed position of said mold, a land on a portion of said second assembly for engaging a downwardly facing, radially extending surface of a relatively rigid insert element constituting one of said composite parts, means on said second assembly for receiving and supporting a portion of uncured rubber to be forced into said molding cavity, said first assembly including inner and outer concentrically disposed mold parts arranged for axial movement relative to each other, a land on said first assembly adapted to engage an upwardly facing portion of said radially directed surface, axially extending means forming a compressible, resilient connection between said relatively movable mold parts, a circumferentially extending annular seal ring support means in one of said movable parts, a lubricous, stiff but resilient seal ring positioned on said support means and having a working surface adapted to engage an oppositely directed surface of said other movable part under a given force to create a snug but sliding fit, means associated with said one of said relatively movable mold parts for confining said seal ring on all the surfaces thereof except said working surface, and means for adjusting the confinement of said seal ring in order to increase said given force.

2. A mold unit as defined in claim 1 wherein said seal ring comprises polytetrafluoroethylene.

3. A mold unit as defined in claim 1 wherein said means for adjusting the confinement of said seal ring comprises a threaded adjustment ring having a connection with said one movable mold part so as to be movable axially thereof and which further includes force applying means disposed between said seal ring and said adjustment ring.

4. A mold unit as defined in claim 1 wherein at least one of said axially movable parts has a tapered surface communicating with the interior of said molding cavity, said seal ring being closely spaced apart from said tapered surface.

5. A mold unit for flashless molding of an article having composite parts, said mold including first and second mold part units, one of said mold part units being adapted to remain fixed and having portions thereof for supporting a relatively stiff portion of the element to be molded, portions of said one mold part unit also defining at least a portion of the molding cavity in which said article is to be formed and the other of said mold part units having two mold elements urged apart from each other by resilient means, one of said mold elements including an annular surface portion of substantial axial extent and the other mold element being adapted for movement therealong, said other mold element having a portion of reduced axial extent adapted to be received in guiding relation to said annular surface portion, said other mold element also including a shoulder for receiving a stiff but resilient sealing ring, a sealing ring made from a lubricous material and seated upon said shoulder, a positioning element disposed atop said sealing ring and having a surface thereof engaging one surface of said sealing ring, whereby said sealing ring is confined on three surfaces and exposed for sealing contact with said annular surface of said one mold element, and an adjustment ring received in threaded relation on said other mold element, said adjustment ring being axially movable and having portions engaged with said positioning element along a surface opposite from the surface engaging said sealing ring, whereby said adjustment ring may be moved axially to adjust the axial force on said sealing ring and thereby vary the position of said mold contacting surface so as to control the working clearance between said sealing ring and said annular surface portion of said one mold element.

* * * * *